US009823758B2

(12) United States Patent
Pedersen et al.

(10) Patent No.: US 9,823,758 B2
(45) Date of Patent: Nov. 21, 2017

(54) AUTOMATIC PERFORMANCE OF TOUCH SCREEN RELATED FUNCTIONALITY IN RESPONSE TO DETECTED STYLUS POSITION

(71) Applicant: NVIDIA Corporation, Santa Clara, CA (US)

(72) Inventors: Christen Kent Pedersen, Sunnyvale, CA (US); Arman Toorians, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/250,062

(22) Filed: Apr. 10, 2014

(65) Prior Publication Data

US 2014/0306909 A1 Oct. 16, 2014

Related U.S. Application Data

(60) Provisional application No. 61/810,997, filed on Apr. 11, 2013, provisional application No. 61/810,578, filed on Apr. 10, 2013.

(51) Int. Cl.
*G06F 3/044* (2006.01)
*G06F 3/0354* (2013.01)
*G06F 3/041* (2006.01)

(52) U.S. Cl.
CPC .......... *G06F 3/03545* (2013.01); *G06F 3/044* (2013.01); *G06F 3/0416* (2013.01)

(58) Field of Classification Search
CPC ................. G06F 3/03545; G06F 3/046; G06F 2200/1632; G06F 2203/04101; G06F 3/0383; G06F 3/0416; G06F 3/044; G06F 3/04
See application file for complete search history.

(56) References Cited

U.S. PATENT DOCUMENTS 5,995,081 A 11/1999 Kato
2003/0107607 A1* 6/2003 Nguyen .............. G06F 3/04883
715/863
2004/0100457 A1* 5/2004 Mandle ................ G06F 1/1626
345/179

(Continued)

*Primary Examiner* — Lun-Yi Lao
*Assistant Examiner* — Jarurat Suteerawongsa

(57) ABSTRACT

A computer system has a touch sensitive display screen within a housing and a touch sensor, which is coupled to a bus. A processor and a memory are coupled to the bus. The housing has a channel for receiving and storing a stylus. A sensor is disposed adjacent to the channel. The sensor interacts with the stylus through the Hall effect caused by a magnet within the stylus and is thus operable for detecting a presence or absence of the stylus without physical contact therewith. The memory has an application which, when executed on the processor, automatically performs one or more stylus related software functions upon a reported absence of the stylus from the channel. One of the software functions includes palm detection rejection with respect to data from the touch sensor. Another function includes display of a GUI displaying a listing of applications that are based on stylus data entry modes. Another function includes setting up OS modes designed for accurate operation of stylus data entry.

12 Claims, 20 Drawing Sheets

(56) References Cited

U.S. PATENT DOCUMENTS

| | | |
|---|---|---|
| 2004/0212586 A1* | 10/2004 | Denny, III ............ G06F 1/1626 345/156 |
| 2007/0103455 A1* | 5/2007 | Omata .................. G06F 1/1626 345/179 |
| 2009/0167727 A1 | 7/2009 | Liu et al. |
| 2009/0262637 A1 | 10/2009 | Badaye et al. |
| 2011/0261026 A1 | 10/2011 | Kim et al. |
| 2011/0273376 A1 | 11/2011 | Dickinson et al. |
| 2012/0146957 A1 | 6/2012 | Dunagan |
| 2012/0153424 A1 | 6/2012 | Wright et al. |
| 2012/0223894 A1 | 9/2012 | Zhao et al. |
| 2012/0327041 A1 | 12/2012 | Harley et al. |
| 2013/0044078 A1 | 2/2013 | Hallenberg et al. |
| 2013/0082937 A1* | 4/2013 | Liu ....................... G06F 1/3262 345/173 |
| 2013/0100071 A1 | 4/2013 | Wright et al. |
| 2013/0135191 A1 | 5/2013 | Shiokawa |
| 2013/0194242 A1 | 8/2013 | Park et al. |
| 2013/0249823 A1 | 9/2013 | Ahn et al. |
| 2014/0028633 A1 | 1/2014 | Mercea et al. |
| 2014/0043245 A1* | 2/2014 | Dowd .................. G06F 3/03545 345/173 |
| 2014/0253464 A1* | 9/2014 | Hicks .................. G06F 3/03545 345/173 |
| 2014/0267078 A1* | 9/2014 | Kukulski ............. G06F 3/0416 345/173 |
| 2014/0267192 A1 | 9/2014 | Matsuura et al. |
| 2015/0015497 A1 | 1/2015 | Leigh |
| 2015/0029163 A1 | 1/2015 | Harris et al. |

\* cited by examiner

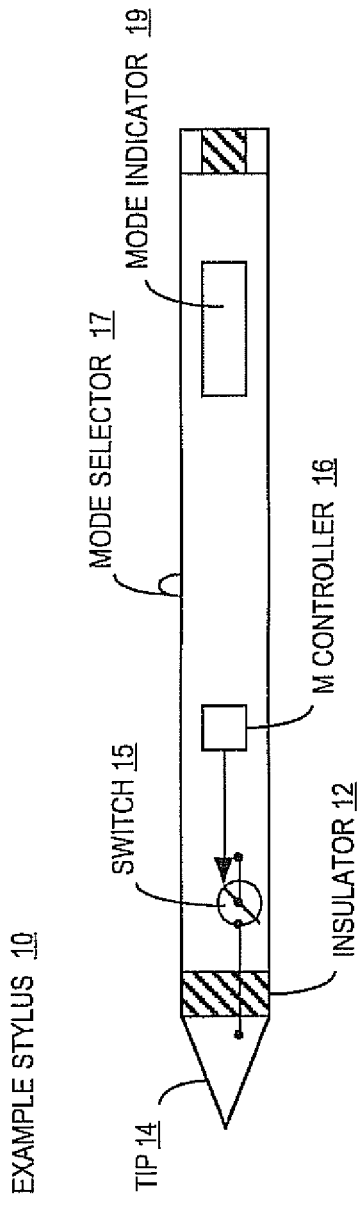
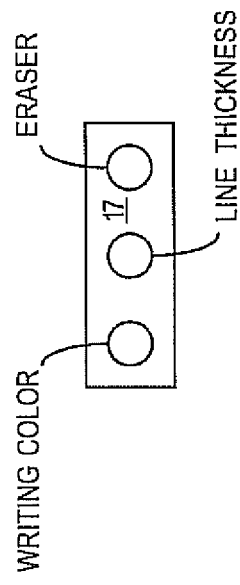
FIG. 1A
FIG. 1B

EXAMPLE TIP SET
60
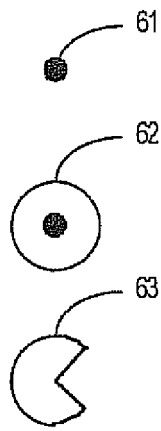
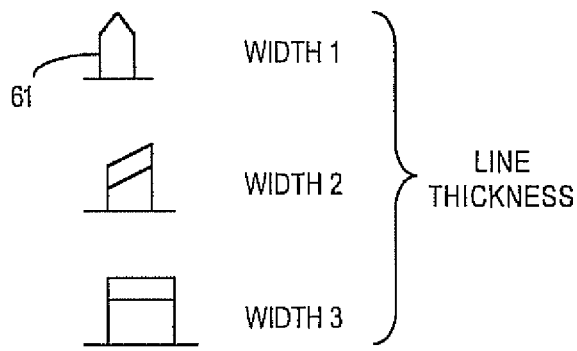
ERASER FUNCTION 
 BLUE
 RED
 GREEN
FIG. 6

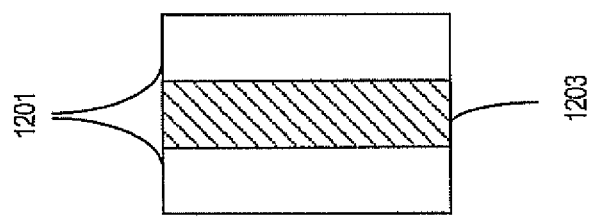
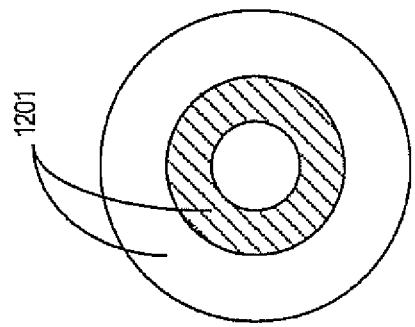
EXAMPLE TIP 1200
FIG. 12

Example Screenshot 1800 - Stylus active

Example Screenshot 1900 - Stylus inactive

AUTOMATIC PERFORMANCE OF TOUCH SCREEN RELATED FUNCTIONALITY IN RESPONSE TO DETECTED STYLUS POSITION

RELATED U.S. APPLICATIONS

The present Application claims priority to Provisional U.S. Patent Application No. 61/810,997 filed Apr. 11, 2013 by Christian Pedersen and Arman Toorians for Pen Signaling for Capacitive Touch Panels, which is incorporated by reference for all purposes as if fully set forth herein.

The present Application also claims priority to Provisional U.S. Patent Application No. 61/810,578 filed Apr. 10, 2013 by Jen-Hsun Huang and Arman Toorians for Methods for Operation a Touch Screen Enabled Device with a Low Cost Stylus, which is incorporated by reference for all purposes as if fully set forth herein.

TECHNOLOGY

Embodiments of the present invention relate generally to electronic devices with interactive displays. More specifically, example embodiments of the present invention relate to automatic actions for use with touch screen enabled electronic devices and associated styli.

BACKGROUND

Touch screen enabled computer systems provide user-interactive electronic displays. Touch screens provide graphical user interface (GUI) operability by relating to user interactions with portions of on-screen information. User interactions allow direct user control over selecting information to be displayed on the touch screen and the appearance of the displayed information, including electronic drawing applications, etc., among other functionality. As touch screens obviate components otherwise needed for GUI functionality (such as physical keyboards, mice, etc.), they are particularly useful in electronic devices that have a small form factor, are lightweight, and are often battery-powered, such as smart phones and tablet computers, etc. Various types of touch screens are in current use.

Capacitive touch screens have superior accuracy and responsiveness characteristics relative to other common types. Capacitive touch screen displays have an electrically insulating transparent display surface such as glass or plastic covered by an array of transparent (or microscopic) conductors, which develop an electrostatic field over the display surface. Users may interact with capacitive touch screens using their finger digits or a pen type or stylus device. Styli, pens and fingers have their own capacitance or active characteristics, which effectively enable and affect their use for signaling with the touch screen display. When a user touches (or in some cases, nearly touches or gestures in proximity with) the display surface with the stylus or finger, the electrostatic field is distorted detectably by the capacitance caused by the interaction.

The distortion in the electrostatic field may be detected as a measured change in a capacitance value at the horizontal (x-axis) and vertical (y-axis) position of contact of the stylus or finger with respect to the planar rectangular display surface. The position of contact may correspond to the position of at least a pixel in an interactive image rendered on the display.

For example, a box shaped image feature labeled "enter," "go," "yes" or "no," "get," "cancel," "stop," etc. shown in a rendered screen image may comprise a GUI "button" with which a corresponding user input is actuated by touching the box with the stylus or finger. The user input corresponding to a programmed selection is sent to a controller module based on the touch at the detected location. The controller may be operable for calling, triggering, initiating, controlling, computing, performing, executing or halting a processing function corresponding to the programmed selection.

The terms "pen" and "stylus" (and their respective plurals "pens" and "styli") may be used herein interchangeably. Capacitive and active pens are in current use, each of which typically operates over an upper surface of a capacitive touch screen. Capacitive pens (also called "passive" pens) are typically operable in contact with the touch screen surface.

Capacitive pens are implemented conventionally by scanning lines and thereby detecting an area or region of a part of the screen over which the pen top contacts the surface, the (x, y) coordinates of a centroid of the detected contact area and a size "z" of a circle with which a tip of the pen makes contact with the screen surface. Conventional capacitive pens are operable for reporting simply the detected area, (x, y) centroid coordinates and z size to an operating system (OS) of the touch screen device and applications running therewith.

Thus, while conventional capacitive pens are operable for effectively substituting for a user's finger to signal the touch screen panel, they lack capability for reporting additional information or communicating a change from one mode of operation, such as "writing," to another mode of operation, such as "erasing."

Current active pens on the other hand may be implemented to report additional information, unavailable from conventional capacitive pens, which may be useful to the touch screen device OS and/or applications. For example, active pens are operable for communicating a change from one mode of operation to another, such as from "writing" to "erasing." Active pens may also report data relating to the shape of a tip of the pen, an angle of the pen tip relative to the touch screen surface, one or more "buttons" or other operable feature actuators of the active pen. The actuators enable or trigger special or specific features available from the active pen. While such additional information and mode changes current active pens can report may be useful, the active pens are significantly more expensive than capacitive pens. Moreover, active pens require associated active circuits and communicative interconnectivity such as a dedicated wireless radio or infrared channel for data exchange with the pad device, which adds undesirable complexity as well as higher cost.

Moreover, many stylus users commonly rest their palm on the touch panel when writing on the touch screen. This unfortunately causes multiple concurrent input signals to be sent to the touch panel (stylus plus palm) which may cause detection related errors. The multiple signals and related errors result from the inability of the computer system to distinguish which of the multiple concurrent input signals relates to the stylus input, e.g., the computer system becomes confused between inputs resulting from the stylus, or from the user's finger, palm or the like.

Additionally, many touch screen related devices require special manual selection of mode control to alternate between keyboard user entry and stylus related data entry or even between finger interaction and stylus interaction. It would be advantageous to provide a system that could more readily switch between stylus, finger and keyboard entry modes in a way that was user friendly and intuitive.

Approaches described in this section may, but have not necessarily been conceived or pursued previously. Unless otherwise indicated, approaches mentioned (or issues identified in relation thereto) should not to be assumed as admitted or as recognized in any alleged prior art merely by inclusion in this section.

SUMMARY

It would be useful to provide a computer system with a touch sensitive display screen that could automatically perform certain stylus related software functionality in response to an automatic detection that the user intends to perform stylus data entry. Moreover, it would be useful to provide this functionality in a useful and intuitive fashion. More specifically, it would be advantageous to increase the accuracy of detecting stylus data entry on a capacitive touch screen without having to discriminate between multiple concurrent inputs, one of which may be inadvertent (e.g., the palm), and without adding complexity to the interactive touch screen system or incurring significant additional expense. It would be advantageous to provide a system that performs certain stylus related software functionality in an automatic fashion responsive to a user interaction that designates stylus use.

Accordingly, embodiments of the present invention provide a computer system with a stylus and a stylus storage slot or channel. A sensor detects when the stylus is removed from the storage slot. The sensor may be a Hall Effect sensor. In response to the detection that the stylus has been removed from the storage slot, certain software functionality is automatically performed within the computer system in anticipation of stylus data entry by the user. For instance, in one embodiment, the touch sensor automatically performs palm detection rejection with respect to detected touch input (from the touch sensor) that is assumed to be from the user's palm resting on the touch sensor while using the stylus for data entry. Palm detection rejection increases the accuracy of stylus data detection. In another embodiment, responsive to the stylus removal, the computer system may automatically present a graphical user interface for user selection of a number of different stylus related applications that can be invoked. In another embodiment, responsive to the stylus removal, the present invention may automatically invoke certain user related stylus preferences, such as cursor image change, initiation of erasure functionality, and automatic invocation of stylus detection and reporting formats (versus finger detection).

More specifically, an embodiment of the present invention is directed to a computer system comprising: a housing; a touch sensitive display screen disposed within the housing and coupled to the bus; a processor coupled to the bus; a memory coupled to the bus; a channel within the housing, the channel for receiving and storing a stylus; and a Hall effect sensor disposed adjacent to the channel, the Hall effect sensor operable for detecting a presence and an absence of a magnet disposed on the stylus, without physically contacting the stylus, responsive to the stylus being inserted into and removed from the channel; wherein the memory comprises an application program that, when executed on the processor, automatically performs one or more stylus related software functions upon the Hall effect sensor reporting an absence of the stylus.

Embodiments include the above and wherein one of the stylus related software functions comprises rendering a graphical user interface window on the touch sensitive display screen, the window comprising a rendered listing of selectable icons of stylus related applications operable to be invoked by on-screen selection thereof. Embodiments include the above and wherein the touch sensitive display screen comprises a touch sensor panel and a display panel and wherein one of the stylus related software functions comprises invoking palm detection rejection associated with detected data from the touch sensor panel. Embodiments include the above and wherein the memory comprises an application programming interface (API) and wherein further one of the stylus related software functions comprises switching the API from reporting finger related messages to reporting stylus related messages upon stylus detection.

Embodiments include the above and wherein the memory comprises an application programming interface (API) and wherein further one of the stylus related software functions comprises invoking electronic erasure functionality within the API and wherein one of the stylus related software functions comprises altering a cursor image in accordance with a predetermined user preference for stylus interaction with the touch sensitive display screen.

Embodiments also include a method of stylus use within a computer system having a touch sensitive display screen, the method comprising: automatically detecting whether or not a stylus is disposed within a receiving channel of the computer system by detecting a presence of and an absence of a magnet disposed on the stylus, the automatically detecting performed by a Hall effect sensor located adjacent to the channel; responsive to the automatically detecting, signaling an operating system of the presence of and absence of the magnet; and automatically performing stylus related software functions within the computer system upon the Hall effect sensor reporting an absence of the stylus.

An embodiment includes a computer system comprising: a housing; a touch sensitive display screen disposed within the housing and coupled to the bus, the touch sensitive display screen comprising a display screen and a touch sensor; a processor coupled to the bus; a memory coupled to the bus; a channel within the housing, the channel for receiving and storing a stylus; and a sensor disposed adjacent to the channel, the sensor operable for detecting a presence and an absence of the stylus, without physically contacting the stylus, responsive to the stylus being inserted into and removed from the channel; wherein the memory comprises an application program that, when executed on the processor, automatically performs stylus related software functions upon the sensor reporting an absence of the stylus and wherein one of the software related functions comprises palm detection rejection with respect to data from the touch sensor.

BRIEF DESCRIPTION OF THE DRAWINGS

FIG. 1A depicts an example capacitive stylus, according to an embodiment of the present invention.

FIG. 1B depicts an example selector, according to an embodiment of the present invention.

FIG. 6 depicts example pen tips, according to an embodiment of the present invention.

FIG. 12 depicts example pen tip shapes, according to an embodiment of the present invention.

DESCRIPTION OF EXAMPLE EMBODIMENTS

Figure 2:
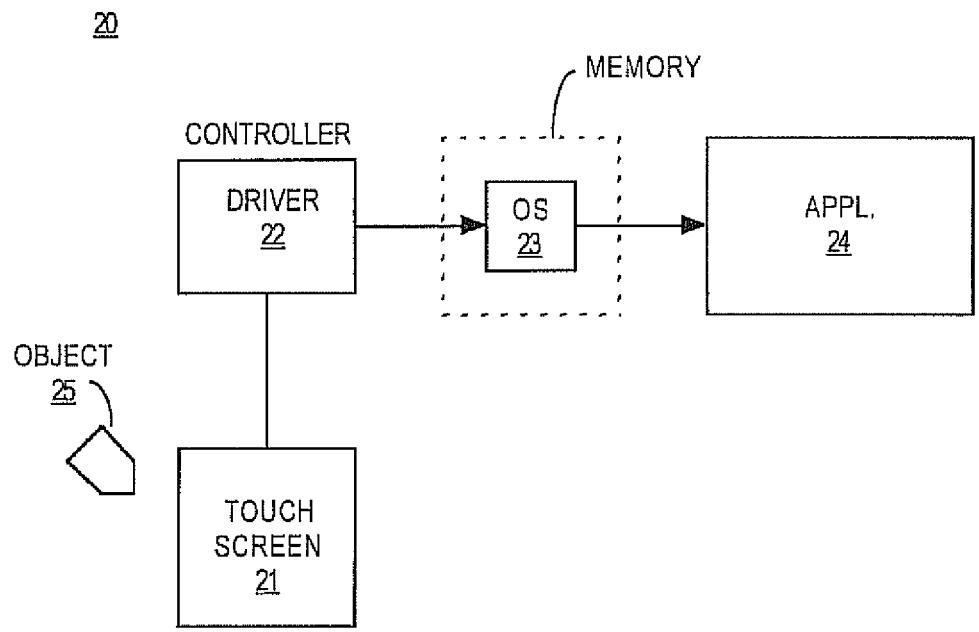
FIG. 2 depicts an example computer system, according to an embodiment of the present invention.

Example embodiments of the present invention automatic actions for use with touch screen enabled electronic devices and associated styli. More specifically, an example embodiment are described in relation to a computer system has a touch sensitive display screen within a housing and a touch sensor, which is coupled to a bus. A processor and a memory are coupled to the bus. The housing has a channel for receiving and storing a stylus. A sensor is disposed adjacent to the channel. The sensor interacts with the stylus through the Hall effect caused by a magnet within the stylus and is thus operable for detecting a presence or absence of the stylus without physical contact therewith channel responsive its insertion or removal from the channel. The memory has an application which, when executed on the processor, automatically performs stylus related software functions upon a reported absence of the stylus from the channel. One of the software functions includes palm detection rejection with respect to data from the touch sensor.

Further embodiments of the present invention relate to automatic actions for use with touch screen enabled electronic devices and associated styli. An example embodiment of the present invention thus relates to increasing the signaling operability of capacitive styli for actuating standard capacitive touch screen display panels without having to discriminate between multiple concurrent inputs, one of which is inadvertent, and without adding complexity to the interactive touch screen system or significant additional cost. An example embodiment of the present invention provides a capacitive stylus, which is inexpensive relative to typical active styli for interacting with a capacitive touch screen display over multiple independently selectable features without inadvertent concurrent inputs from fingers, palms or the like and without an intermediating communication device. An example embodiment of the present invention provides a touch sensitive interactive system in which user inputs from an inexpensive capacitive stylus are made without intermediating communication to a touch screen display device for selectively engaging various independently available operability features of the stylus while simultaneously preventing inadvertent non-stylus related inputs.

An example embodiment of the present invention relates to automatic actions for use with touch screen enabled electronic devices and associated styli. In an example embodiment of the present invention, a computer system has a touch sensitive display screen within a housing and a touch sensor, which is coupled to a bus. A processor and a memory are coupled to the bus. The housing has a channel for receiving and storing a stylus. A sensor is disposed adjacent to the channel. The sensor interacts with the stylus through the Hall effect caused by a magnet within the stylus and is thus operable for detecting a presence or absence of the stylus without physical contact therewith channel responsive its insertion or removal from the channel. The memory has an application which, when executed on the processor, automatically performs stylus related software functions upon a reported absence of the stylus from the channel. One of the software functions includes palm detection rejection with respect to data from the touch sensor.

More specifically, an example embodiment is described below in relation to a computer system with a touch sensitive display screen. The touch sensitive display screen is disposed within a housing of the system. The touch sensitive display screen has a display screen and a touch sensor, which is coupled to a bus. A processor and a memory are coupled to the bus. The housing has a channel therein for receiving and storing a stylus. A sensor is disposed adjacent to the channel. The sensor is operable for detecting a presence and an absence of the stylus, without physically contacting the stylus, responsive to the stylus being inserted into and removed from the channel. The memory has an application program that, when executed on the processor, automatically performs stylus related software functions upon the sensor reporting an absence of the stylus from the channel. One of the software related functions includes palm detection rejection with respect to data from the touch sensor.

An example embodiment may also be implemented in which the sensor comprises a photosensitive sensor operable for detecting light from an optical source disposed adjacent to the channel opposite from the sensor when the stylus is removed from the channel.

In an example embodiment, the memory comprises an operating system (OS) for execution by the processor. The sensor initiates generation of interrupt signals to the operating system responsive to detecting a presence and an absence of the stylus and one of the stylus related software functions comprises rendering a graphical user interface window on the touch sensitive display screen. The rendered window lists selectable icons of stylus related applications operable to be invoked by on-screen selection thereof.

The computer system may also comprise an application programming interface (API). One of the stylus related software functions may comprise switching the API from detecting finger related interactions and reporting finger related messages to detecting stylus related interactions and reporting stylus related messages.

The description of example embodiments includes computer implemented methods, computer systems with interactive touch screen displays, and styli and related pen like devices for interacting therewith. Reference will now be made in detail to some implementations of the example embodiments as illustrated in the accompanying drawings. The same reference numbers will be used to the extent possible throughout the drawings and the following description to refer to the same or like items. It should be apparent to artisans of ordinary skill in technologies that relate to computer systems and interactive displays, graphical user interfaces (GUIs) and other electronic fields however, that example embodiments of the present invention may be practiced without some of these specifically described details. Example embodiments of the present invention are described in relation to computer implemented methods, computer systems and devices for interacting therewith for signaling touch screen enabled electronic devices.

For focus, clarity and brevity, as well as to avoid unnecessarily occluding, obscuring, obstructing or obfuscating features that may be somewhat more germane to, or significant in explaining example embodiments of the present invention, this description may avoid describing some well-known processes, structures, components and devices in exhaustive detail. Artisans of ordinarily skill in technologies related to computers, GUIs, touch screen display devices and other interactive electronic devices should realize that the following description is made for purposes of explanation and illustration and is not intended to be limiting in any way. On the contrary; other embodiments should readily suggest themselves to artisans of such skill in relation to the example features and elements described herein and any corresponding benefits such embodiments may achieve. Example embodiments of the present invention relating to computer implemented methods, computer systems and related devices and platforms and automatic actions for use with touch screen enabled electronic devices and associated styli are described as follows.

Example Electronic Stylus

FIG. 1A depicts an example electronic stylus 10, according to an example embodiment of the present invention. The electronic stylus 10 comprises a body 11 suitable for being hand held by a user as a writing instrument.

The body 11 comprises a tip 14 at one end for interfacing with a touch panel, wherein the tip 14 touches a portion thereof. An insulator 12 disposed near the tip 14 insulates capacitance of the body 11 from the tip 14. A switch unit 15 selectively couples the tip 14 electrically to a remainder portion of the body 11 opposite from the tip 14 in relation to the insulator 12.

A controller 16, such as a microcontroller or a field programmable gate array (FPGA), controls an operation of the switch unit 15. A mode selector 17 is disposed on the body 11. In an example embodiment, the mode selector 17 is operably responsive to an actuating pressure made by a user of the electronic stylus 10 to signal the controller 16.

The mode selector 19 may comprise a single mechanical or electromechanical button, dial, or similar actuating mechanism, which may actuate an associated array of electrical contacts disposed within the body 11. The mode selector may comprise a plurality of mechanical or electromechanical buttons, which may each actuate a separate corresponding electrical contact. FIG. 1B depicts another example mode selector 17, according to an embodiment of the present invention. The selector 17 comprises individual buttons, each with assigned functionality.

The controller 16 is configured or programmed to enter one of multiple (a plurality of) modes responsive to the signal of the mode selector 17. The controller 16 is configured or programmed to control the switch unit 15 to switch in accordance with different signal patterns depending on a mode entered by the controller 16. The electronic stylus 10 may further comprise a display housed on the body 11. The display is operable for presenting a representative indication of a current mode of the controller 16 or other useful indicia.

An example embodiment may be implemented in which the multiple modes correspond to multiple different writing color representations, with which the stylus 10 may write on the surface of the touch screen display when enabled with a drawing application. The different signal patterns may comprise square signal waves of a certain frequency, which vary from each other by their individual duty cycles to indicate different color values. The different signal patterns may also comprise square signal waves having a given duty cycle, which vary from each other by their individual frequency to indicate different color values.

Example Touch Sensitive Computer System

FIG. 2 depicts an example touch sensitive computer system 20, according to an embodiment of the present invention. The touch sensitive system 20 comprises a capacitive touch screen display panel 21 and a controller 22 coupled to scan the capacitance touch display panel 21 for detecting capacitance thereof.

Control logic 23 is coupled to the controller 22 for detecting a position of an interaction of an object 25 with the capacitive touch display panel 21, relative to its substantially rectangular touch sensitive surface. Responsive to the detection of the position of the interaction with the object 25, the control logic 23 is operable for reporting a corresponding horizontal/vertical (x, y) position thereof.

The control logic 23 is operable in combination with the controller 22 for detecting a capacitive signal pattern originating from the object 25. Responsive to the detection of the capacitive signal pattern, the control logic 23 is operable for reporting a type corresponding to the signal, with which the signal is characterized. The type signal may comprise a color type. In this manner, different color values may be selected by the pen interface and communicated to the computer system by the signal pattern. The object 25 may comprise a stylus and the color type may correspond to a color with which the stylus may write to the touch sensitive display panel 21. A selected color pattern may be maintained until changed via a new selection and a new pattern implemented.

An example embodiment may be implemented in which the capacitive signal pattern comprises a square wave of a prescribed duty cycle and/or a square wave of a prescribed frequency. Different signal patterns may each comprise square signal waves of a certain frequency, which vary from each other by their individual duty cycles. Different signal patterns may also comprise square signal waves, each of which has a given duty cycle but varies from the other square wave signals by a unique individual frequency.

The control logic 23 and the controller 22 are operable in combination for detecting an area of a portion of the surface of the touch sensitive display panel 21 over which the object 25 interaction therewith. Responsive to the detection of the area of the interaction, the control logic is further operable for reporting a magnitude corresponding to the interaction.

In an example embodiment, the touch sensitive system 20 further comprises a processor 27 and a memory 28 coupled thereto. An operating system (OS) 29 resides in the memory 28 and is executed by the processor 27. The control logic 23 reports the detected (x, y) position and the type of the signal to the OS 29, (x, y, type).

Figure 3:
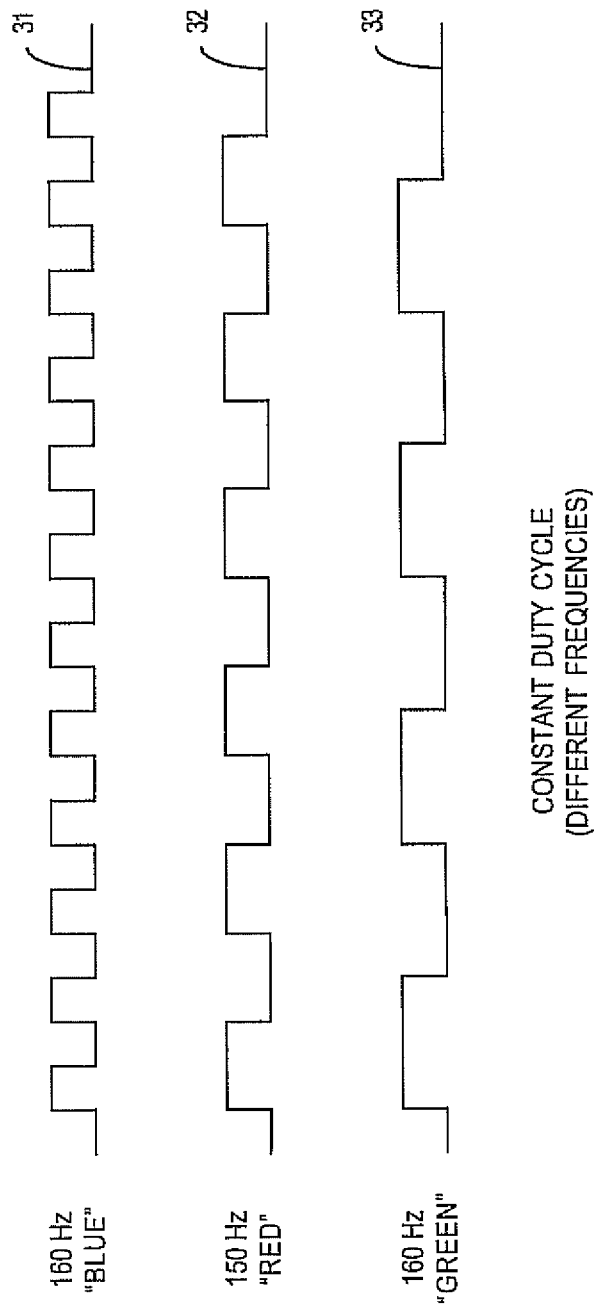
FIG. 3 depicts example signals, according to an embodiment of the present invention.

FIG. 3 depicts a waveform of an example set 30 of type signals, according to an example embodiment of the present invention. The set 30 of type signals comprises a first type signal 31, a second type signal 32 and a third type signal 33, each of which has the same duty factor but a different frequency. Each of the different frequencies corresponds to a separate color representation.

For example, the first signal type 31 has a frequency of 140 Hertz (Hz), which may correspond to rendering a representation of a blue color on the capacitive touch screen display panel. The second signal type 32 has a frequency of 150 Hz, which may correspond to rendering a representation of a red color on the capacitive touch screen display panel. The third signal type 33 has a frequency of 160 Hz, which may correspond to rendering a representation of a green color on the capacitive touch screen display panel. The signal frequency selected should be less than half of the touch sensitive panel's update frequency, e.g., 300 Hz.

Other colors may be represented by signal types having other frequencies, and sharing the same duty cycle. Other frequencies may be implemented with the same duty cycle.

Figure 4:
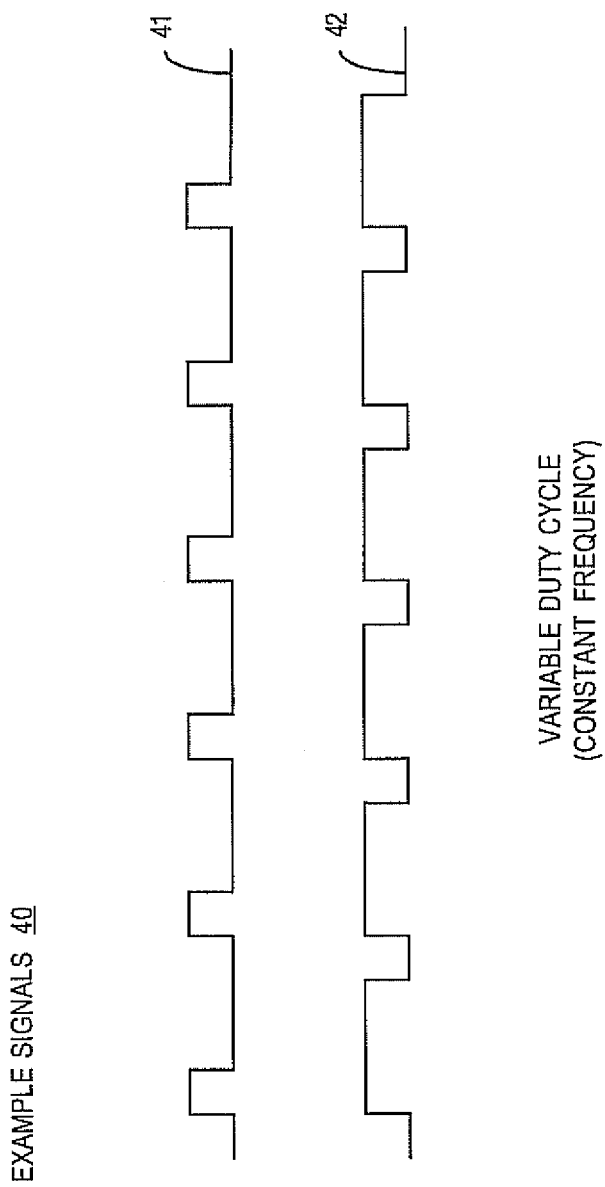
FIG. 4 depicts example signals, according to an embodiment of the present invention.

FIG. 4 depicts a waveform of an example set 40 of type signals, according to an example embodiment of the present invention. The set 40 of type signals comprises a fourth type signal 41, and a fifth type signal 42, each of which has the same frequency (e.g., 150 Hz) but a different duty cycle. Each of the different duty cycles may correspond to a separate operability function.

For example, the fourth signal type 41 has a lower duty cycle than the fifth type signal 42 and may correspond to an operable writing function. The fifth signal type 42 has a higher duty cycle than the fourth type signal 41 and may correspond to an erasing function. Other operating functions may be represented by type signals having other duty cycles that share a particular frequency, and other frequencies may be used.

Figure 5:
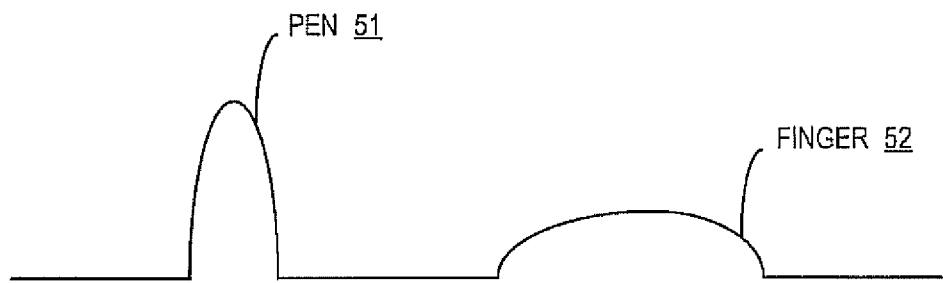
FIG. 5 depicts example signals, according to an embodiment of the present invention.

FIG. 5 depicts an example set 50 of waveforms corresponding to separate capacitive input signals, according to an example embodiment of the present invention. The set 50 of waveforms has a first waveform 51 and a second waveform 52. The first waveform 51 corresponds to an input to a capacitive touch screen display device by a capacitive stylus. In contrast, the second waveform 52 corresponds to an input to a capacitive touch screen display device by a finger of a user.

FIG. 6 depicts a set 60 of example pen tips for a capacitive stylus, according to an example embodiment of the present invention. The set 60 of example pen tips comprises a first tip 61, a second tip 62 and a third tip 63. The first tip 61 may have a lower area of contact with the surface of a capacitive touch screen display than the second tip 62 and/or the third tip 63. The first tip 61 may input thus input a first type signal, which may relate to a writing function.

Each of the second tip 62 and/or the third tip 63 may have a higher area of contact with the surface of a capacitive touch screen display than the first tip 61, and/or a shape covering a contact area different than the shape of the first tip 61. The second tip 62 may input thus input a second type signal, which may relate to an eraser operating function and/or the third tip 63 may thus input a third type signal, which may relate to another operating function. The tips are distinguishable from each other via the area of contact mode by each against the surface of the touch sensitive screen.

Example Computer Implemented Processes

Figure 7:
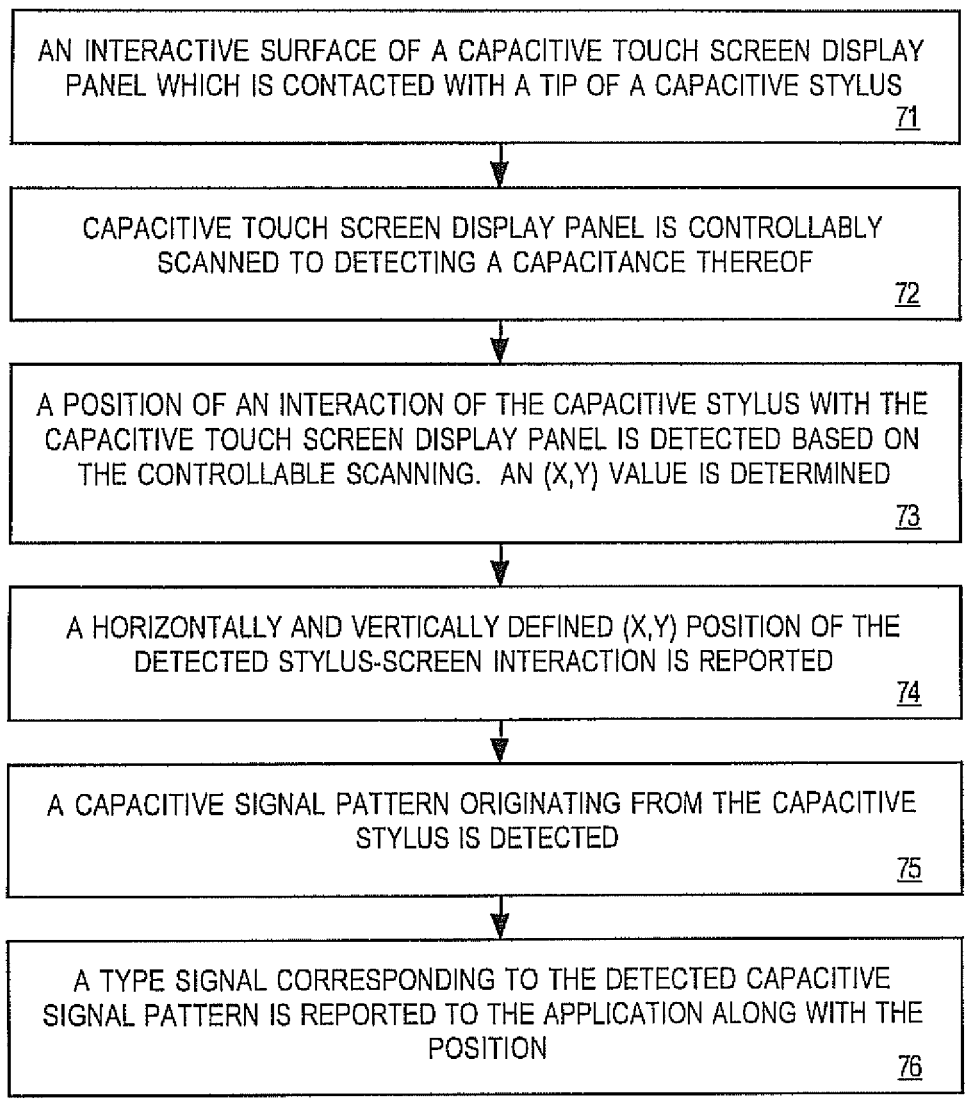
FIG. 7 depicts a flowchart for an example computer implemented process, according to an embodiment of the present invention.

FIG. 7 depicts a flowchart for an example computer implemented process 70, according to an example embodiment of the present invention. Process may comprise a computer implemented method for interfacing with an application running thereon.

In process step 71, an interactive surface of a capacitive touch screen display panel with is contacted with a tip of a capacitive stylus, which may affect an electrical, electrostatic and/or capacitive charge field of the surface.

In process step 72, the capacitive touch screen display panel is controllably scanned to detecting a capacitance thereof. In process step 73, a position of an interaction of the capacitive stylus with the capacitive touch screen display panel is detected based on the controllable scanning. An (x, y) value is determined.

In process step 74, a horizontally and vertically defined (x, y) position of the detected stylus-screen interaction is reported. In process step 75, a capacitive signal pattern originating from the capacitive stylus is detected. In process step 76; a type signal corresponding to the detected capacitive signal pattern is reported to the application along with the position.

The type signal corresponds to representing a color type or other operability value such as an erase function. The capacitive signal pattern may comprise a square wave of a prescribed duty cycle, or a square wave of a prescribed frequency but having a varying duty cycle. The detection of the capacitive signal pattern may include detecting an area of the interaction. The reporting the type signal may thus include reporting a magnitude corresponding to the detected interaction area.

The capacitive stylus is operable for changing a mode of operating based on a user input thereto. The reporting the type signal may thus include reporting a change in the detected capacitive signal pattern corresponding to the changing the operating mode.

Figure 8:
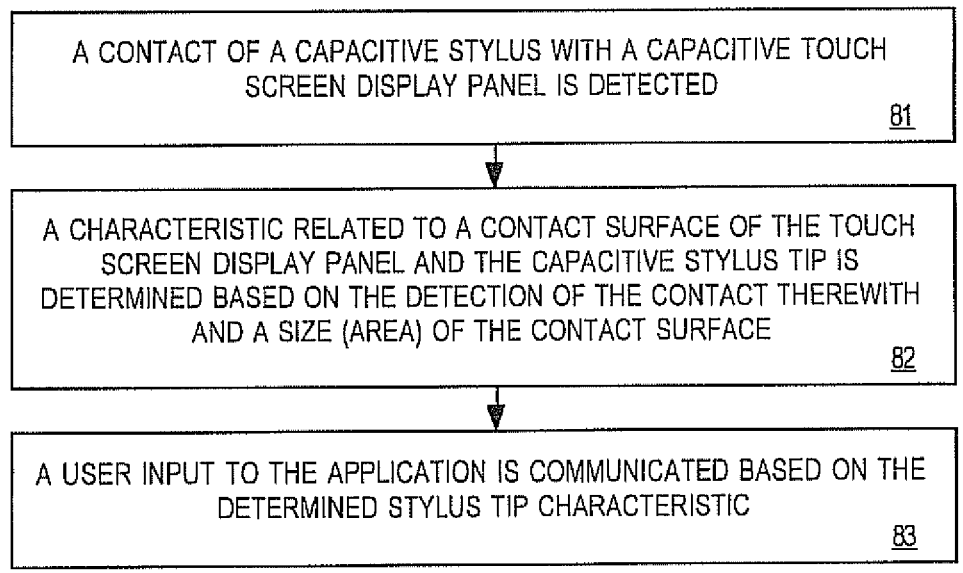
FIG. 8 depicts a flowchart for an example computer implemented process, according to an embodiment of the present invention.

FIG. 8 depicts a flowchart for an example computer implemented process 80 for interacting with an application running on a computer system, according to an embodiment of the present invention. In process step 81, a contact of a capacitive stylus with a capacitive touch screen display panel is detected.

In process step 82, a characteristic related to a contact surface of the touch screen display panel and the capacitive stylus tip is determined based on the detection of the contact therewith and a size (area) of the contact surface. In process step 83, a user input to the application is communicated based on the determined stylus tip characteristic.

Figure 9:
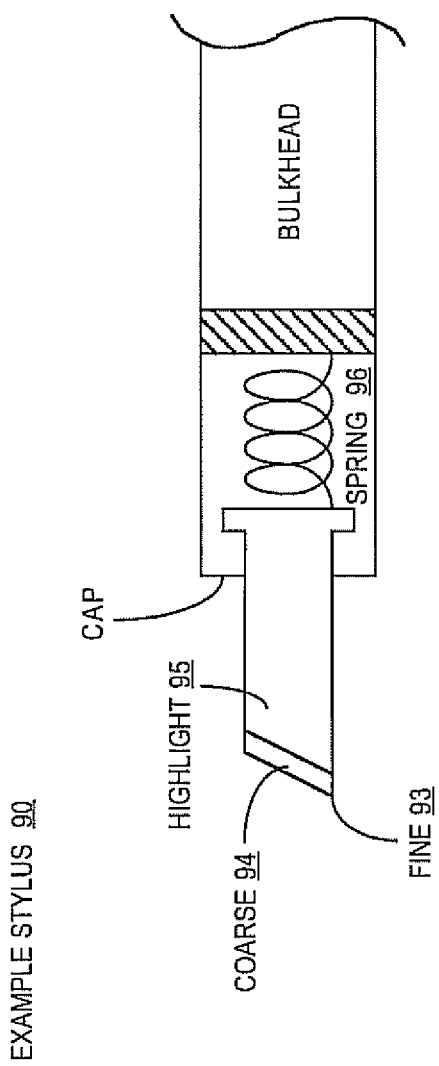
FIG. 9 depicts an example pen tip, according to an embodiment of the present invention.

FIG. 9 depicts an example stylus 90, according to an embodiment of the present invention. The stylus has a body 91 and a tip 92. A characteristic of the tip 92 may relate to a contour of the stylus tip, a shape of the stylus tip, a pattern of the stylus tip, a capacitance of the stylus tip, and/or a pressure of the stylus tip against the touch screen display panel surface.

The contour 91 of the stylus tip may comprise a fine contour and the communicated input relate to fine writing, using a movement of the stylus by the user upon the touch screen panel surface. The contour of the stylus tip may include a course contour 94 and the communicated input relate to course writing using a movement of the stylus by the user upon the touch screen display panel surface, or to a highlighting effect 95 using a movement of the stylus by the user upon the touch screen display panel surface.

The capacitive stylus comprises a body component 91 suitable for being hand held by the user as a writing instrument, wherein the tip 92 is disposed at an end of the body 91. A spring component 96 may comprise disposed within the body 91 for mechanically loading the pressure of the stylus tip 92 against the touch screen display panel surface responsive to a force applied by the user to the stylus body 91. The communicated input may thus include selecting a line thickness for writing upon the touch screen display panel surface.

The stylus tip 92 may be made from a deformable material such as conductive silicon. The pressure applied to the tip via the stylus results in compression of the tip and therefore an increase in the surface area contact. In this fashion, pressure can be detected and used to vary the line thickness of the resulting drawn line.

Figure 10:
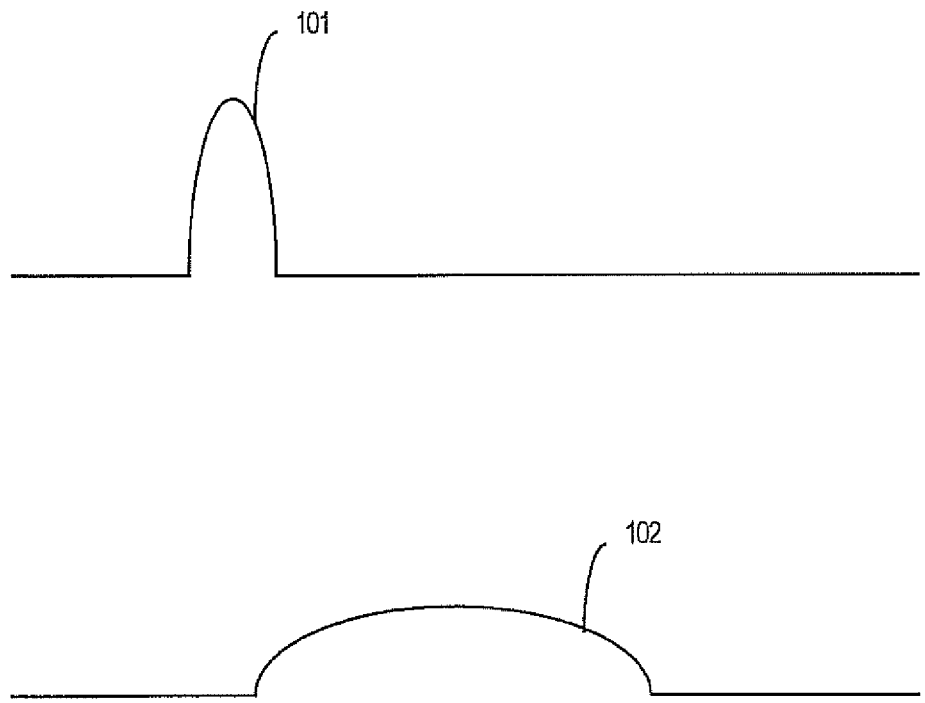
FIG. 10 depicts example signals, according to an embodiment of the present invention.

FIG. 10 depicts a set 100 of example waveforms, according to an example embodiment of the present invention. The example waveforms represent pressure via varying signals. A profile of the example waveforms in the set 100 correspond to capacitive signals that vary the level of pressure exerted by the stylus tip 92 to the touch screen display panel surface. The waveform profile 101 may thus correspond to a pressure level that is heavy in relation to the waveform profile 102, each of which may relate to separate type signals.

Figure 11:
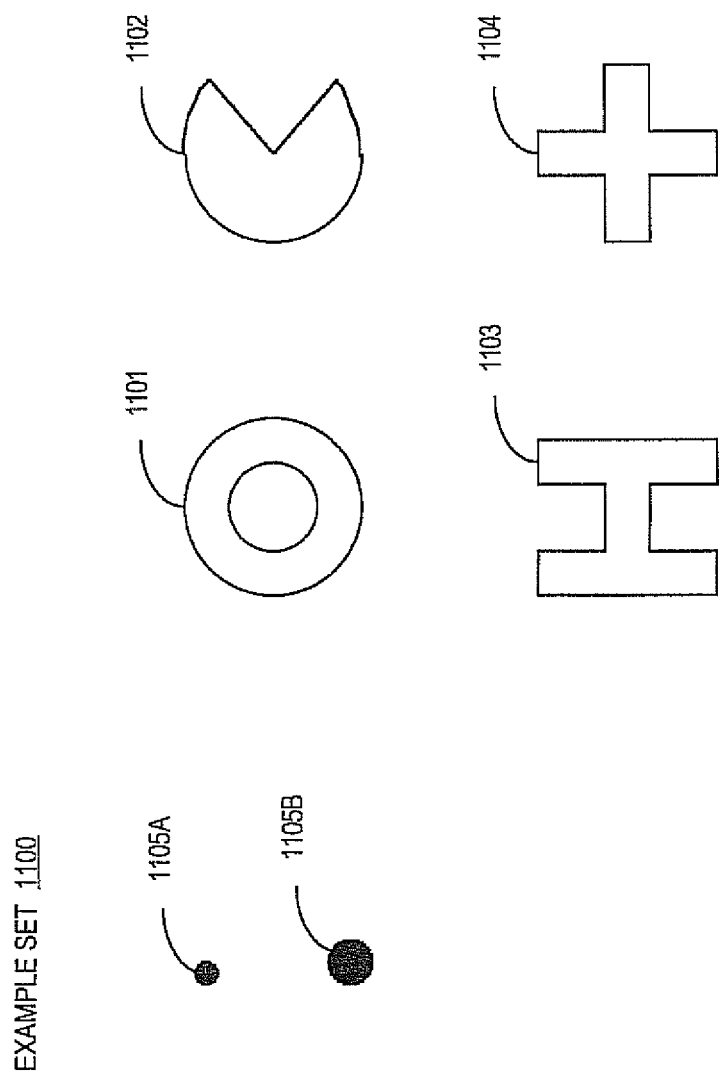
FIG. 11 depicts example pen tip shapes, according to an embodiment of the present invention.

FIG. 11 depicts an example set 1100 of pen tip shapes, according to an example embodiment of the present invention. The various shapes can be represented via a mixture of conductive and non-conductive material fabricated together in accordance to portions that comprise the given shape. The shape of the stylus tip may comprise a circle 1105A or 1105B (or ovoids, ellipses, etc.), each having different sizes, a torus ("doughnut") 1101, a sector (e.g., a "Pac-Man" style shape) 1102, a cross (x, +, etc.) 1104, and/or a pair of parallel bars joined at a midpoint of each by a perpendicular bar (H) 1103. Each of the shapes may input a different type signal than the other shapes when contacting the touch sensitive surface. These different shapes may involve different functionality when detected by the touch panel, e.g., erasure functionality.

FIG. 12 depicts an example set 1200 of pen tip shapes, according to an example embodiment of the present invention. The shape of the stylus tip may comprise a pair 1201 of concentric rings, in which an outer ring of the concentric pair of rings is conductive and an inner circle of the concentric pair of circles is nonconductive and concentrically surrounds a substantially central conductor. The communicated input may thus comprise an input relating to an eraser operation of the stylus. The shape of the stylus tip may also comprise a pair of parallel conductor bars 1202, each separated by an insulator or dielectric 1203. These "bar code" type tips can be effective as locks or keys, which may be used to lock or unlock a computer system by application of the array onto a designated area of a touch sensitive screen.

Figure 13:
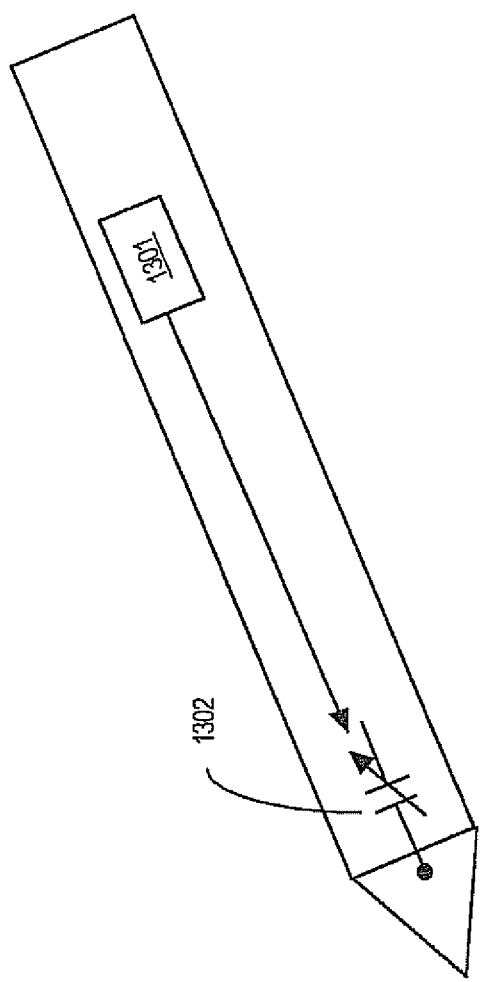
FIG. 13 depicts an example pen tip controller, according to an embodiment of the present invention.

FIG. 13 depicts an example capacitive stylus 1300, according to an example embodiment of the present invention. The capacitive stylus 1300 comprises an actuator component 1301 and a variable capacitor component 1302. The variable capacitor component 1302 is operable for controllably changing the capacitance of the stylus tip 1303 responsive to a manipulation by the user of the actuator component 1301. The communicated input may thus comprise a selection of a writing color based on a detected stylus tip capacitance.

Figure 14:
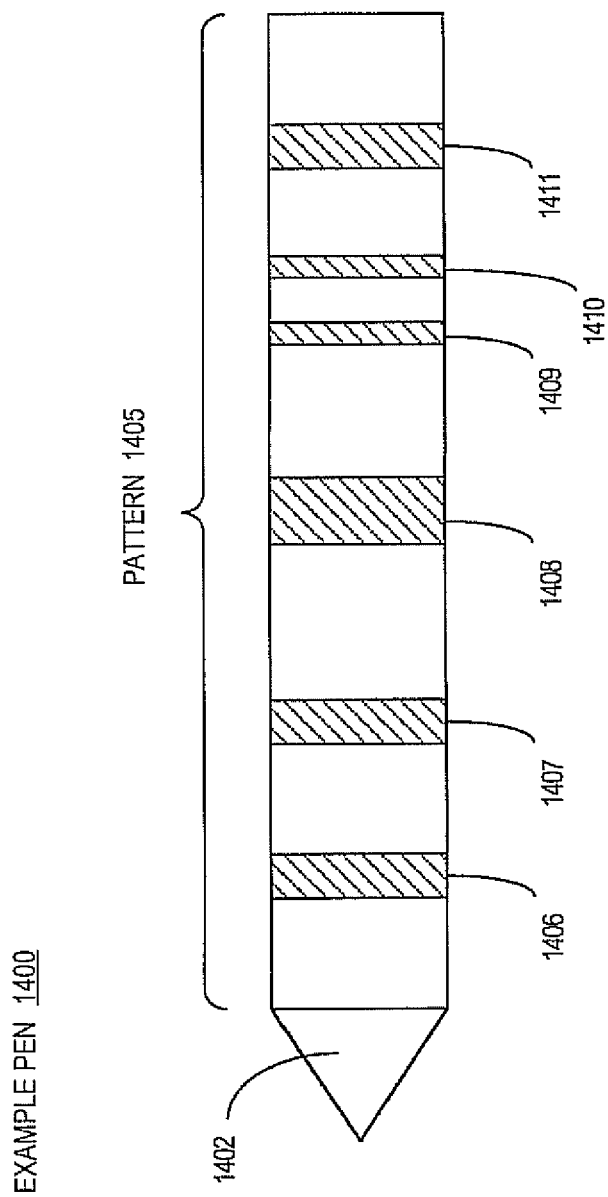
FIG. 14 depicts an example stylus, according to an embodiment of the present invention.

FIG. 14 depicts an example capacitive stylus 1400, according to an example embodiment of the present invention. The electronic stylus 1400 is operable for interacting with an application running on a computer system. The electronic stylus 1400 has a body 1401 suitable for being hand held as a writing instrument and comprising an insulating material.

The electronic stylus 1400 has a tip 1402 disposed at the end of the body 1401 for interfacing with a touch screen display panel of the computer system. The electronic stylus 1400 has a pattern comprising a plurality of (multiple) capacitive conductors 1406, 1407, 1408, 1409, 1410 and 1411 disposed in an array 1405 over the body 1401; any number of capacitive numbers may be included. Each of the multiple capacitive conductors 1406-1411, inclusive are insulated from each other by the insulating nonconductive material of the body 1401.

The touch screen display panel is operable for detecting a capacitive signature of the pattern 1405 when interacting with the touch screen display panel and is operable for interacting with an application running on a computer system by communicating a characteristic of the electronic stylus 1400 based on the detected capacitive signature.

The pattern 1405 may correspond to a particular size of the electronic stylus 1400, a particular shape of the electronic stylus 1400, and/or a particular type of the electronic stylus 1400.

The pattern 1405 may uniquely correspond to a key, e.g., bar code pattern, for operably unlocking a particular electronic stylus 1400, to a particular feature of the electronic stylus 1400 and/or to a particular identity of the electronic stylus 1400 or a user thereof.

Figure 15:
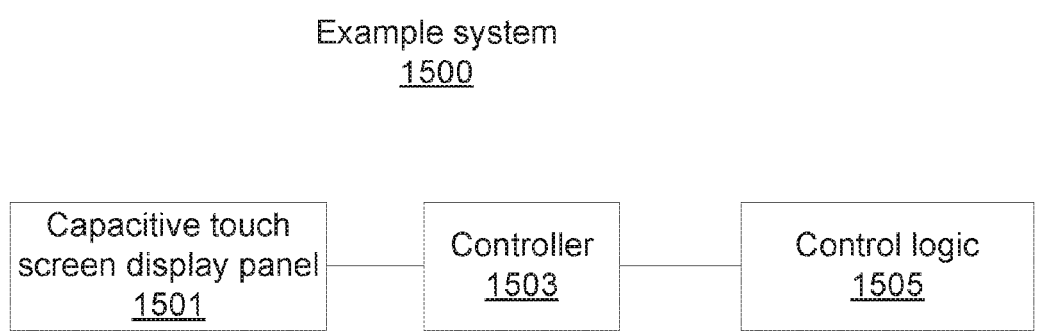
FIG. 15 depicts an example computer system, according to an embodiment of the present invention.

FIG. 15 depicts an example touch sensitive computer system 1500, according to an example embodiment of the present invention. Computer system 1500 has a capacitive touch screen display panel 1501. A controller 1503 is operable for scanning the capacitive touch screen display panel 1501 for detecting capacitance thereon and changes in the electric field associated with the panel caused by interactions with external capacitance sources.

For example, external objects that may touch (or closely approach) an outer surface of the capacitive touch screen display panel 1501 disturb the electrostatic field thereof. Control logic 1505 is coupled to the controller 1503 and operable therewith for detecting an interaction of an object with the capacitive touch screen display panel and responsive thereto for reporting a corresponding input to an application operable with the capacitive touch screen display panel relating to a characteristic of the object.

The characteristic of the object relates to a tip of the object. An example embodiment may be implemented in which the characteristic of the object relates to a characteristic of a tip of the object. The characteristic may relate to a contour of the tip, a shape of the tip, a conductive pattern on the tip of the object, a capacitance of the tip of the object, and/or a pressure of the tip of the object against a surface of the touch screen display panel 1501.

Figure 16:
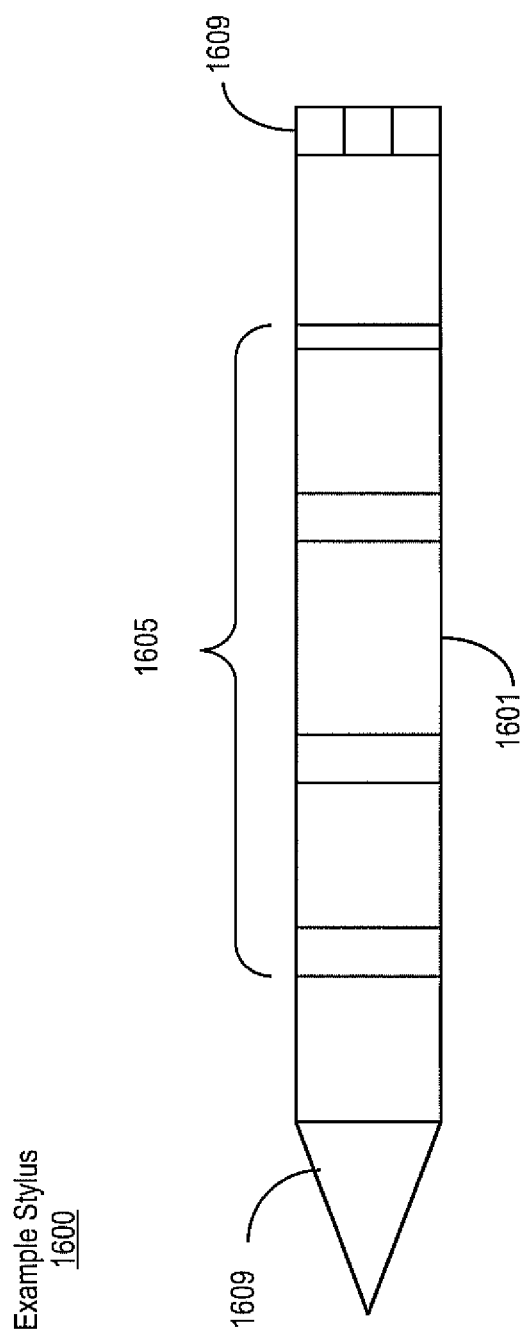
FIG. 16 depicts an example stylus, according to an embodiment of the present invention.

An example embodiment may be implemented in which the characteristic of the object relates to a body of the object. FIG. 16 depicts an example stylus object 1600, according to an example embodiment of the present invention. Stylus 1600 has a tip 1607 disposed at a first end of a body component 1601. The tip 1607 may comprise configured to be operated as a writing nib, brush and/or highlighting applicator. Stylus 1600 has a tip 1609 at a second end of the body component 1601, opposite from the first end. The tip 1609 may comprise of a unique shape or larger than the first tip and may be configured to be operated as an eraser.

The body 1601 comprises an insulating material with good dielectric properties such as a polymer, plastic, acrylic, ceramic, glass, carbon fiber reinforced polymer, wood or the like. A plurality of (multiple) capacitive conductors is disposed in an array or pattern 1605 over the body 1601. Each of the multiple capacitive conductors of the pattern 1616 is insulated from each other by the insulating material of the body 1601.

Each of the multiple capacitive conductors may be separated from one or more of the other capacitive conductors by a different amount or length of the insulating material to form a particular pattern 1605. Each of the multiple capacitive conductors may have matching or unique individual mass, size, thickness, contour, conductivity and/or capacitance properties. The particular form of pattern 1605 and the properties of each of the multiple conductors combine to present a certain capacitive signature. The touch screen display panel is operable for detecting the capacitive signature of the array of capacitive conductors.

The pattern 1605 may uniquely correspond to a particular size of the electronic stylus, a particular shape of the electronic stylus, a particular type of the electronic stylus, a particular feature of the electronic stylus, and/or a particular identity of the electronic stylus. Moreover, the pattern may uniquely correspond to a key for operably unlocking a particular electronic stylus or a particular feature thereof.

Example embodiments of the present invention may incorporate the features described above. An example embodiment of the present invention relates to automatic actions for use with touch screen enabled electronic devices and associated styli. More specifically, an example embodiment are described in relation to a computer system has a touch sensitive display screen within a housing and a touch sensor, which is coupled to a bus. A processor and a memory are coupled to the bus. The housing has a channel for receiving and storing a stylus. A sensor is disposed adjacent to the channel. The sensor interacts with the stylus through the Hall effect caused by a magnet within the stylus and is thus operable for detecting a presence or absence of the stylus without physical contact therewith channel responsive its insertion or removal from the channel. The memory has an application which, when executed on the processor, automatically performs stylus related software functions upon a reported absence of the stylus from the channel. One of the software functions includes palm detection rejection with respect to data from the touch sensor.

Automatic Performance of Stylus Related Functionality Upon Detection of Stylus Position for Touch Screen Displays An example embodiment of the present invention relates to a touch screen enabled computer system that provides a user interface via a stylus device. Upon automatic detection of a stylus removed from a storage slot, certain stylus related functionality is automatically invoked in the computer system to increase stylus detection accuracy and to facilitate selection of stylus use applications, etc., for the user. Other functionalities can also be invoked automatically upon the stylus being detected as inserted back into the storage slot.

Figure 17B:
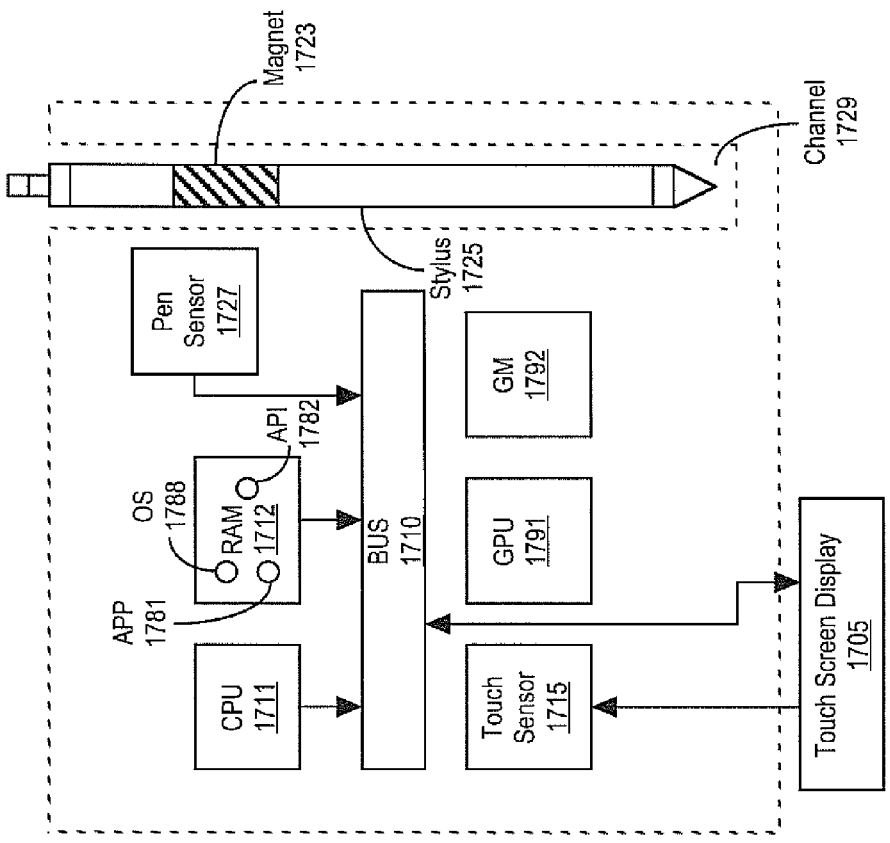
FIG. 17B depicts the example computer system in a block diagram, according to an embodiment of the present invention.
Figure 17A:
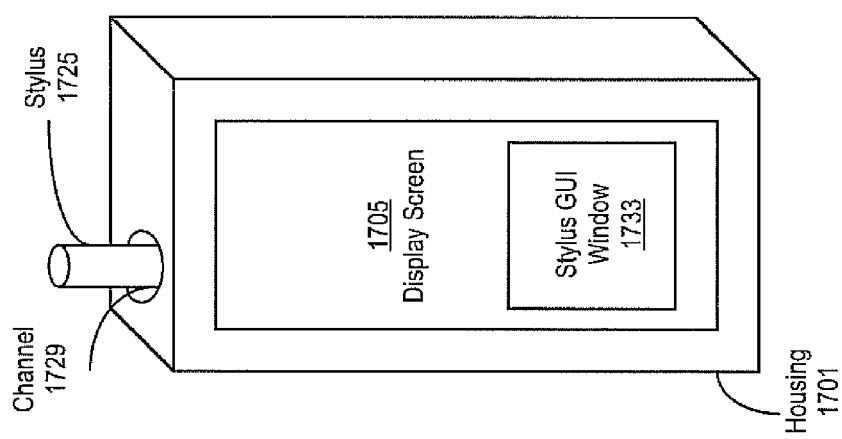
FIG. 17A depicts an example computer system in an outer aspect, according to an embodiment of the present invention.

FIG. 17A depicts an exemplary touch screen enabled computer system 1700, according to an embodiment of the present invention with automatic stylus position detection. The computer system 1700 has a housing 1701. A touch sensitive display screen 1705 is disposed within the housing 1701. The housing 1701 has a channel or slot 1729 therein for receiving and storing a stylus 1725. When stored, the stylus may be totally or partially contained within the slot. Electronic circuits and associated components of the computer system 1700 are disposed substantially within the housing 1701 and are operable for actuating its various functionality, including implementing a GUI on the touch screen display 1705. Importantly, a sensor is disposed within the channel 1729 for detecting the presence or absence of the stylus. In one embodiment, the sensor does not make contact with the stylus 1725 in order to perform this sening.

FIG. 17B depicts a block diagram of the example touch screen enabled computer system 1700, according to an embodiment of the present invention. The example computer system 1700 is described with reference to FIG. 17A and FIG. 17B. The computer system 1700 has a communication bus 1710 for transferring signals, data, and power between the electronic components disposed within the housing 1701. A memory 1714 is coupled to the bus 1710 and comprises a non-transitory data storage medium, which tangibly stores program instructions in its physical memory cells. A processor 1711 is coupled to the bus 1710.

The processor 1710 is operable as a central processing unit (CPU) for executing the instructions stored in the memory 1714, which control the computer system 1700 in the actuation of its various functionality. A graphics processing unit (GPU) 1791 and an associated graphics memory 1792 may also be coupled to the bus 1710 and interoperable with the CPU 1710 for rendering data on the touch screen display 1705. A touch sensor 1715 is coupled to the bus and operable for sensing a touch interaction by a pen, finger, palm or the like with the surface of the touch sensitive display screen 1705.

The housing 1701 has a channel or slot 1729 therein for receiving and storing a stylus 1725. The stylus can be used by a user to interact with the touch screen. The user's finger can also be used to interact with the touch screen. A sensor 1727 is disposed adjacent to the channel 1729. The sensor 1727 is operable for detecting a presence and an absence of the stylus within the channel 1729, without physically contacting the stylus 1725, for example, responsive to the stylus 1725 being inserted into and removed from the channel 1729, respectively. In an example embodiment, the sensor 1727 comprises a Hall effect sensor operable for detecting a magnet 1723, which is disposed on or within or as part of the stylus 1725. The sensor 1727 may also be implemented as a photo-sensor operable for detecting light from an optical source disposed adjacent to the channel 1729 opposite from the sensor 1727 when an opaque portion of the stylus 1725 is removed from the channel 1729.

In an example embodiment, the memory 1712 comprises an operating system (OS) 1788 for execution by the processor 1711. In one embodiment, the pen sensor 1727 initiates generation of interrupt signals to the OS 1788 responsive to detecting a presence and an absence of the stylus 1725 in the channel 1729. In this way, the OS can be informed of the status of the stylus with respect to the channel.

The memory 1712 has one or more application programs 1781, which when executed on the processor 1711, automatically perform software functions related to the stylus 1725 upon the pen sensor 1727 reporting an absence of the stylus 1725 from the channel 1729. In other words, when the stylus is detected as being removed or removed from the slot, certain software functionality is automatically performed to assist in stylus data entry, the assumption being that stylus removal precedes stylus use. One of the software related functions includes palm detection rejection with respect to data from the touch sensor 1715. When the stylus is removed from the slot, it is assumed that the user will use the stylus for interacting with the computer system. Therefore, to facilitate stylus interaction, multiple stylus related functionalities are automatically invoked in response to stylus removal. Likewise, when the stylus is reinserted into the channel, finger related (or other) touch functionalities can be invoked.

The touch sensor 1715 will detect any contact with the screen. Users typically rest their palm on the screen when using the stylus to draw or write. The input signals caused by the palm and the stylus together may confuse touch detection. The touch panel uses palm rejection modes. In palm rejection mode, the palm is detected due to its relatively large size as compared to the stylus tip. The palm input signals are then rejected, as palm-resting is expected during stylus use. By rejection palm input signals, the stylus signals can more accurately be detected and reported to draw and write applications, for instance. Therefore, when the stylus is detected as removed, palm rejection mode is automatically entered to increase accuracy for stylus data entry detection.

One other of the stylus related software functions (of application 1781) comprises rendering a GUI window 1733 (FIG. 17A) on the touch sensitive display screen. When stylus removal is detected, the GUI 1733 is automatically displayed. The rendered window 1733 lists selectable icons of stylus related applications operable to be invoked by on-screen selection thereof. Such applications can include a draw application and/or a write application, for instance. Any application that is stylus related can be displayed. In another embodiment, the GUI window may also include a selection for invoking a handwriting recognition application suitable for use with the stylus. Therefore, the GUI 1733 contains commonly used application programs that are useful with stylus data entry modes.

Figure 18:
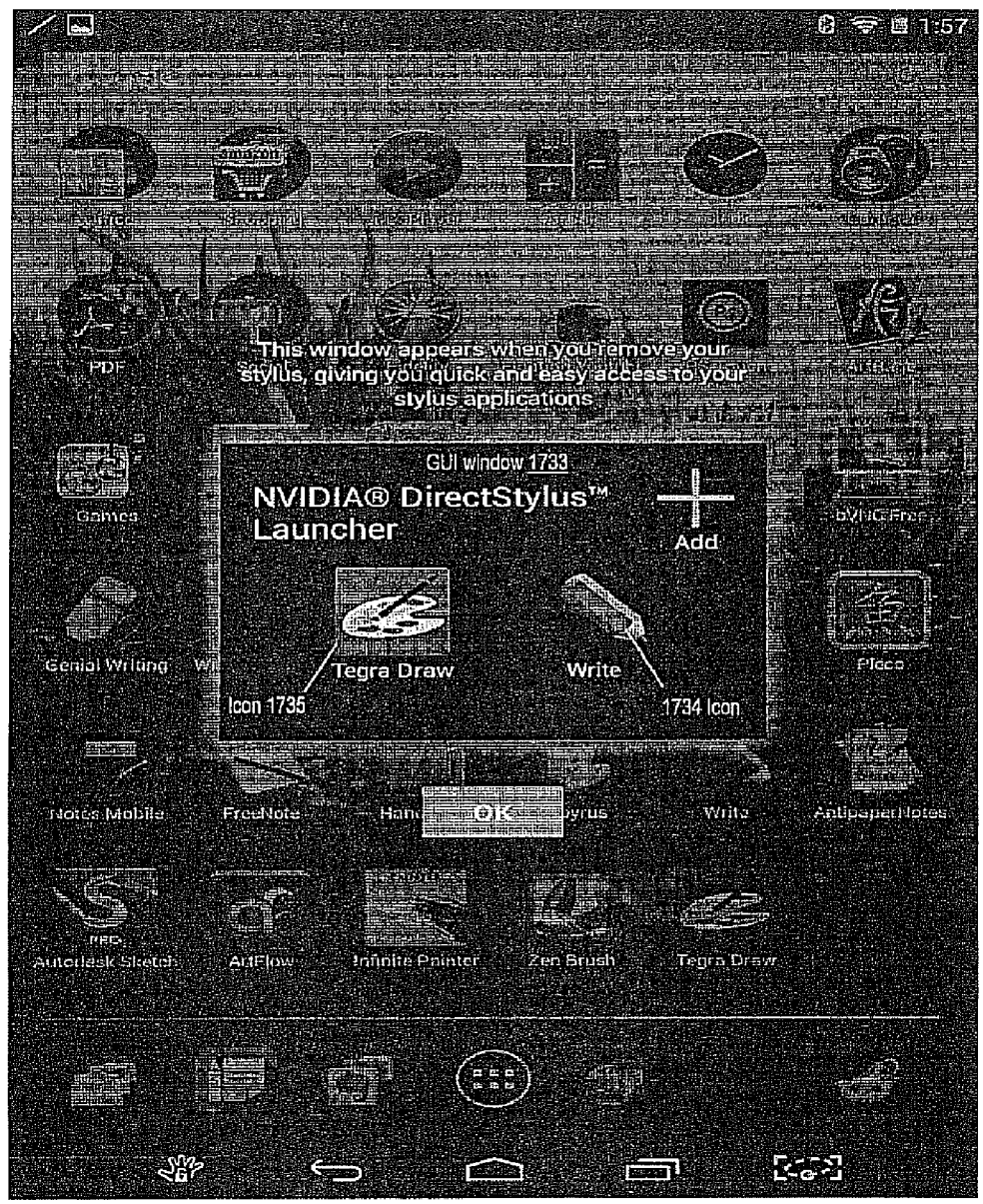
FIG. 18 depicts an example screenshot showing an interactive menu of stylus functions, according to an embodiment of the present invention.

FIG. 18 depicts an example screen shot 1800, according to an embodiment of the present invention. In response to a detection that the stylus has been removed from the slot, on-screen window 1733 is presented. The window 1733 rendered in the screen shot 1800 presents the selectable icons 1734 and 1735 giving the user quick and easy selection of stylus related applications. The icons are rendered upon withdrawal of the stylus 1725 from the channel 1729. Either icon can be selected by use of the stylus and involve stylus related applications. Selecting the icon 1734 enables the stylus 1725 for operating in a writing related mode. Selecting the icon 1737 enables the stylus 1725 to function in a drawing related operating mode. It is appreciated that the icons shown in FIG. 18 are exemplary and other stylus related applications can be presented within window 1733.

The computer system 1700 (FIG. 17B) may also comprise an API 1782. One of the stylus related software functions automatically invoked by stylus removal may comprise automatically switching the API 1782 from detecting and reporting finger related interactions, to detecting stylus related interactions and reporting stylus related messages. In this respect, the functionality would relate to the manner and format in which the API reports interactions with the touch panel. An example embodiment may be implemented in which the stylus related messages comprise an (x, y) coordinate value of a stylus interaction and a stylus characteristic, C, of the stylus interaction, e.g., color or draw/erase functionality, for instance. The stylus related software functions may also comprise invoking electronic erasure functionality within the API 1782 and/or altering a cursor image in accordance with a predetermined user preference for interacting with the touch sensitive display screen 1705 using the stylus 1725.

Figure 19:
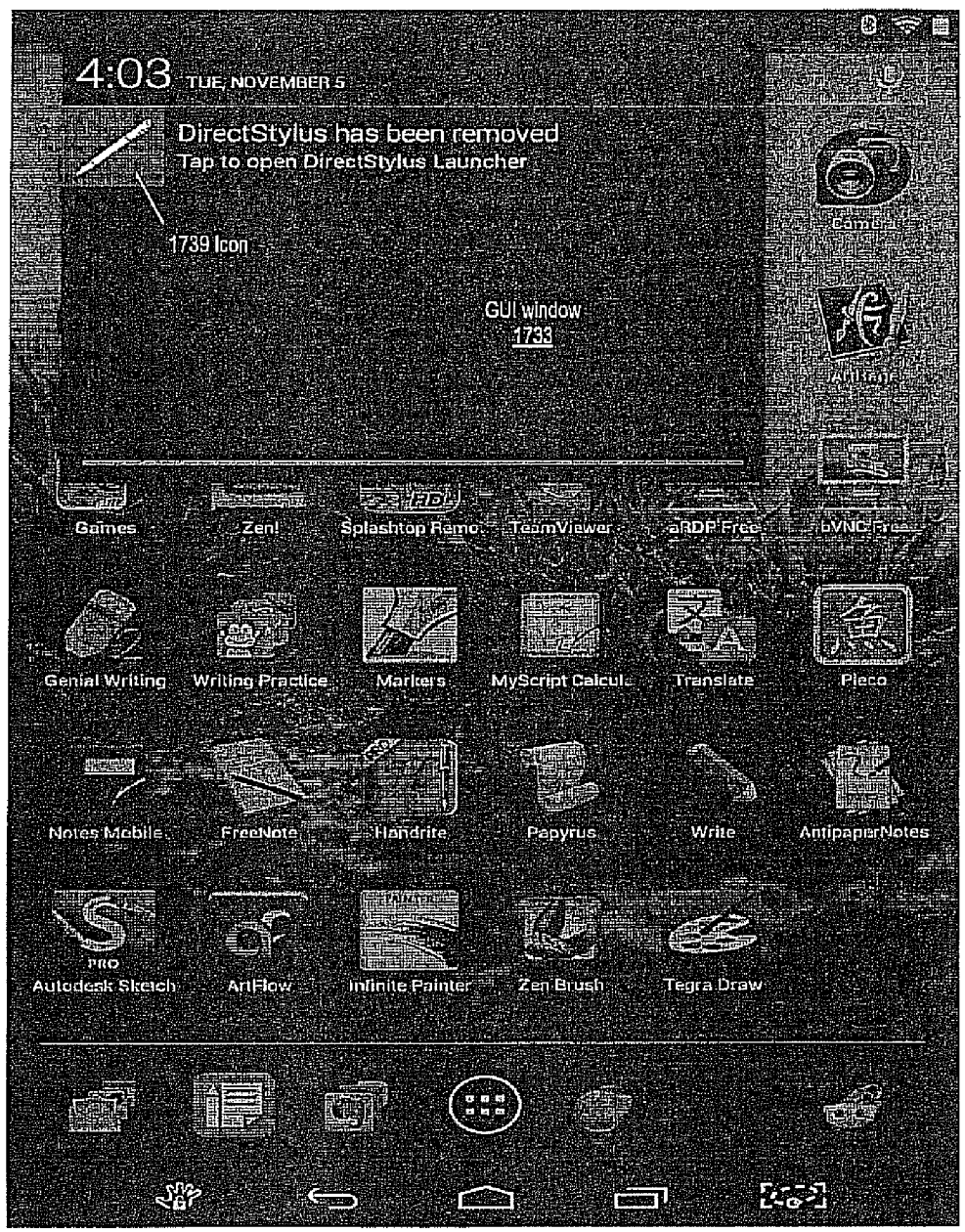
FIG. 19 depicts an example screenshot corresponding to an inserted stylus functions, according to an embodiment of the present invention.

FIG. 19 depicts another example screen shot 1900, according to an embodiment of the present invention. Window 1733 is rendered in response to a non-stylus touch input being detected by the touch panel. Window 1733 includes a selectable icon 1739. The icon 1739 may be displayed upon closing or overriding the stylus related software functions and/or detecting a non-stylus related finger or palm interaction with the touch sensitive display screen 1705, with the stylus 1725 remaining withdrawn from the channel 1729. Selecting the icon 1739 enables the stylus related software functions to reactivate.

Figure 20:
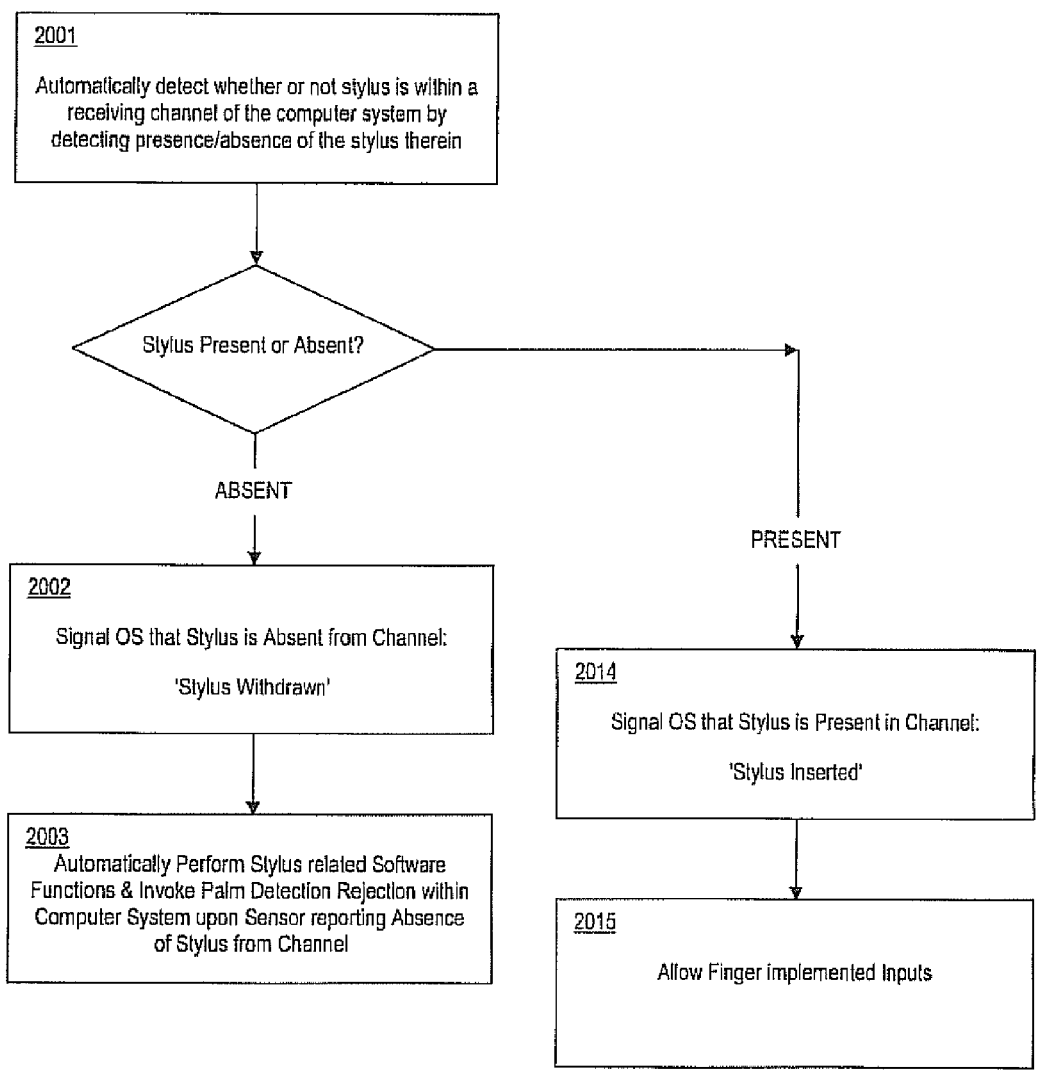
FIG. 20 depicts a flowchart for an example process for automatically activating stylus related functions, according to an embodiment of the present invention.

FIG. 20 depicts an example computer implemented process 2000, according to an example embodiment of the present invention. Process 2000 comprises a method of stylus use within a computer system having a touch sensitive display screen.

In process step 2001, it is automatically detected whether or not a stylus is within a receiving channel of the computer system by detecting a presence of and an absence of the stylus.

The automatic detection may be performed by a Hall effect sensor (or a photo sensor) located adjacent to the channel, which is operable for detecting a magnet disposed on the stylus. With the stylus present, disposed within (or inserted into) the channel, the sensor senses the magnetic field associated with the stylus magnet based on the Hall effect and outputs a corresponding 'stylus inserted' signal. With the stylus withdrawn from the channel, the sensor thus senses the corresponding absence (or diminution or fluctuation) of the magnetic field and outputs a corresponding 'stylus withdrawn' signal. The sensor does not physically contact the stylus in performance of the detection thereof.

An example embodiment may also be implemented in which the sensor comprises a photodetector operable for detecting light from an optical source disposed adjacent to the channel opposite from the sensor when an opaque portion of the stylus is removed from the channel and outputting a corresponding 'stylus withdrawn' signal. With the stylus inserted into the channel, light from the optical source is blocked or absorbed by the stylus' opacity and the detector thus outputs a corresponding "stylus inserted' signal.

Responsive to the automatic detection of the presence or absence of the stylus in the channel, an OS is signaled in process step 2002. The OS is signaled that the stylus is inserted within the channel by the 'stylus inserted' signal. The OS is signaled that the stylus is withdrawn from the channel by the 'stylus withdrawn' signal. In an example embodiment, the signaling is performed by generating corresponding OS interrupts.

In process step 2003, stylus related software functions are performed automatically within the computer system upon the pen sensor reporting an absence of the stylus, as when the stylus is withdrawn from the receiving channel. In this mode, it is assumed by the computer software that the user intends to use stylus related data entry since the stylus is removed. In this mode, automatic software functionality is invoked that more accurately detects stylus interaction and that can facilitate stylus use within the computer system.

In an example embodiment, the stylus related software functions include rendering a GUI window on the touch sensitive display screen. The window presents a rendered listing of selectable icons of stylus related application programs operable to be invoked by on-screen selection thereof. The stylus related applications may include a draw application and a write application, for instance.

In an example embodiment, the stylus related software functions comprise invoking palm detection rejection associated with detection data from the touch sensor panel. In palm detection rejection, the touch sensor attempts to detect a palm interaction, by its size and shape. If it locates the palm, it rejects the inputs from the palm as not relevant data entry, e.g., corresponding to palm-resting. By rejecting the palm inputs, stylus detection accuracy greatly improves.

In an example embodiment, the computer system comprises an API and the stylus related software functions comprise switching the API from reporting finger related messages to reporting stylus related messages to applications upon stylus detection. The stylus related software functions may also comprise invoking an electronic erasure functionality within the API and altering a cursor image according to a predetermined user preference for stylus interaction with the touch sensitive display screen.

The palm detection rejection may optionally be overridden according to a user selection. Overriding palm detection rejection may allow simultaneous or contemporaneous inputs to the touch sensitive screen by the stylus and by fingers or the like.

If it is detected in step 2001 that the stylus is present within the receiving channel of the computer system, then the 'stylus inserted' signal reports the presence of the stylus to the OS in step 2014. Upon receiving the report of the stylus presence in the receiving channel, then in process step 2015, the OS allows users to input to the computer system by contacting the touch screen display panel with their fingers or the like.

Thus, an example embodiment of the present invention is described in relation to automatic actions for use with touch screen enabled electronic devices and associated styli. More specifically, an example embodiment is described above in relation to a computer system has a touch sensitive display screen within a housing and a touch sensor, which is coupled to a bus. A processor and a memory are coupled to the bus. The housing has a channel for receiving and storing a stylus. A sensor is disposed adjacent to the channel. The sensor may interact with the stylus through the Hall effect caused by a magnet within the stylus and is thus operable for detecting a presence or absence of the stylus without physical contact therewith channel responsive its insertion or removal from the channel. The memory has an application which, when executed on the processor, automatically performs stylus related software functions upon a reported absence of the stylus from the channel. One of the software functions includes palm detection rejection with respect to data from the touch sensor.

Definitions that are expressly set forth in each or any claim specifically or by way of example herein, for terms contained in relation to features of such claims are intended to govern the meaning of such terms. Thus, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer system comprising:
   a housing;
   a bus;
   a touch sensitive display screen disposed within the housing and coupled to the bus;
   a processor coupled to the bus;
   a memory coupled to the bus;
   a channel within the housing, the channel configured for receiving and storing a capacitive stylus; and
   a Hall effect sensor disposed adjacent to the channel, the Hall effect sensor operable for detecting a presence and an absence of a magnet disposed on the capacitive stylus, without physically contacting the capacitive stylus, responsive to the capacitive stylus being inserted into and removed from the channel,
   wherein the memory comprises instructions of an application program that, when executed on the processor, automatically performs one or more stylus related software functions upon the Hall effect sensor reporting an absence of the capacitive stylus, wherein the one or more stylus related software functions comprises:
   rendering a graphical user interface (GUI) window on the touch sensitive display screen upon detection of the absence of the capacitive stylus, the GUI window comprising a rendered group of selectable icons of capacitive stylus related applications;
   switching from reporting finger related messages to reporting stylus related messages upon detection of the absence of the capacitive stylus, wherein the stylus related messages comprise: an (x, y) coordinate value of a capacitive stylus interaction; a stylus tip shape; a stylus size; and a capacitive stylus characteristic of the capacitive stylus interaction, wherein the memory further comprises instructions of an application programming interface (API) and wherein the switching comprises switching the API from reporting the finger related messages to reporting the stylus related messages upon the detection;
   automatically invoking palm detection rejection associated with detection data from the touch sensitive display screen upon the Hall effect sensor reporting the absence of the capacitive stylus; and
   invoking electronic erasure functionality within the API responsive to said touch sensitive display screen detecting the stylus tip shape.

2. The computer system of claim 1 wherein the memory comprises instructions of an operating system for execution by the processor and wherein further the Hall effect sensor is configured to initiate generation of interrupt signals to the operating system responsive to detecting a presence and an absence of the magnet.

3. The computer system of claim 1 wherein the stylus related applications further comprises: a draw application; and a write application.

4. The computer system of claim 1 wherein the one or more stylus related software functions comprise altering a cursor image in accordance with a predetermined user preference for a stylus interaction with the touch sensitive display screen.

5. A method of stylus use within a computer system comprising a touch sensitive display screen, the method comprising:
   automatically detecting whether or not a capacitive stylus is within a receiving channel of the computer system by detecting a presence of and an absence of a magnet disposed on the capacitive stylus, the automatically detecting performed by a Hall effect sensor located adjacent to the receiving channel;
   responsive to the automatically detecting, signaling an operating system of the presence of or absence of the magnet; and
   automatically performing stylus related software functions within the computer system upon the Hall effect sensor reporting an absence of the capacitive stylus, wherein the stylus related software functions comprises:
   rendering a graphical user interface (GUI) window on the touch sensitive display screen, the GUI window comprising a rendered group of selectable icons of stylus related applications operable to be invoked by on-screen selection thereof;

switching from reporting finger related messages to reporting stylus related messages upon detection of the absence of the capacitive stylus, wherein the stylus related messages comprise: an (x, y) coordinate value of a capacitive stylus interaction; a stylus tip shape; a stylus size; and a capacitive stylus characteristic of the capacitive stylus interaction, and wherein further the switching comprises switching an API from reporting the finger related messages to reporting the stylus related messages upon the detection;

invoking palm detection rejection associated with detection data from the touch sensitive display screen upon the Hall effect sensor reporting the absence of the capacitive stylus; and invoking electronic erasure functionality within the API responsive to said touch sensitive display screen detecting the stylus tip shape.

6. The method of claim 5 wherein the Hall effect sensor does not physically contact the capacitive stylus to perform the detecting.

7. The method of claim 5 wherein the signaling is performed by generating interrupts to the operating system.

8. The method of claim 5 wherein the stylus related applications comprise: a draw application; and a write application.

9. The method of claim 5 wherein the touch sensitive display screen comprises a touch sensor panel and a display panel.

10. The method of claim 5 wherein the stylus related software functions further comprise altering a cursor image in accordance with a predetermined user preference for stylus interaction with the touch sensitive display screen.

11. A computer system comprising:
a housing;
a bus;
a touch sensitive display screen disposed within the housing and coupled to the bus, the touch sensitive display screen comprising a display screen and a touch sensor;
a processor coupled to the bus;
a memory coupled to the bus;
a channel within the housing, the channel for receiving and storing a capacitive stylus; and
a sensor disposed adjacent to the channel, the sensor operable for detecting a presence and an absence of the capacitive stylus, without physically contacting the capacitive stylus, responsive to the capacitive stylus being inserted into and removed from the channel;
wherein the memory comprises instructions of an application program that, when executed on the processor, automatically performs stylus related software functions upon the sensor reporting an absence of the capacitive stylus, wherein the stylus related software functions comprises:
rendering a graphical user interface window on the touch sensitive display screen, the graphical user interface window comprising a rendered group of selectable icons of stylus related applications operable to be invoked by on-screen selection thereof; and
switching from detecting finger related interactions and reporting finger related messages to detecting stylus related interactions and reporting stylus related messages upon the sensor reporting absence of the capacitive stylus, wherein the computer system comprises an application programming interface (API) and wherein further the switching comprises switching the API from detecting the finger related interactions and reporting the finger related messages to detecting the stylus related interactions and reporting the stylus related messages;
invoking palm detection rejection associated with detection data from the touch sensitive display screen upon the Hall effect sensor reporting an absence of the capacitive stylus; and
invoking electronic erasure functionality within the API responsive to said touch sensitive display screen detecting a stylus tip shape.

12. The computer system of claim 11 wherein the memory comprises instructions of an operating system for execution by the processor and wherein further the sensor is configured to initiate generation of interrupt signals to the operating system responsive to detecting a presence and an absence of the stylus.

* * * * *